April 9, 1940.  R. J. BEAN  2,196,622
DETACHABLE PIPE COUPLING
Filed June 27, 1938
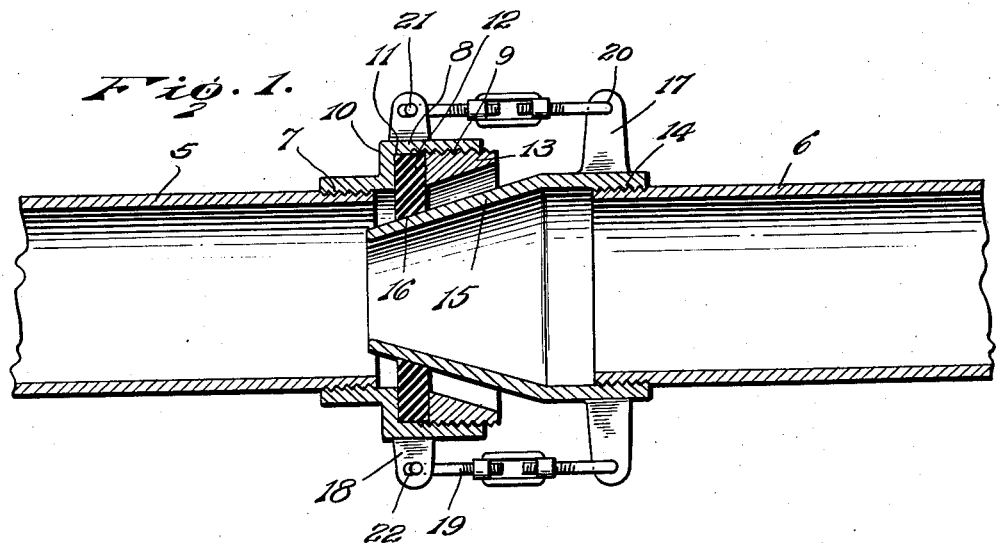
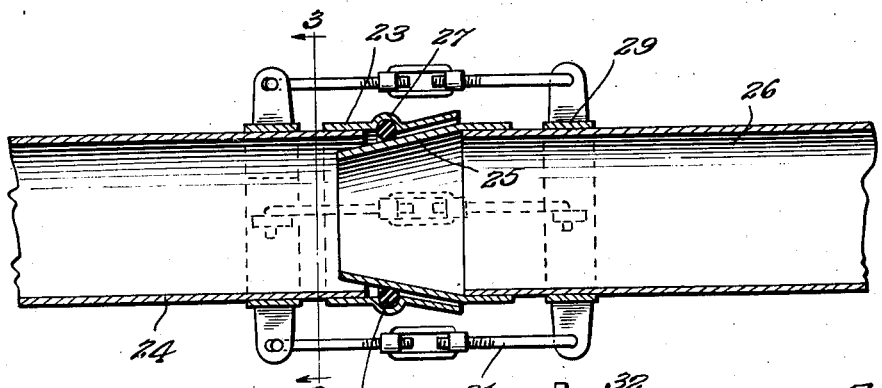
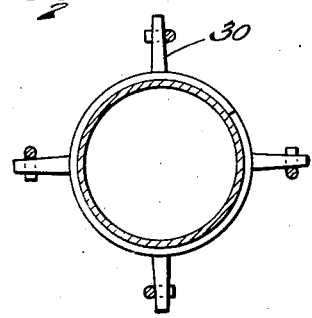
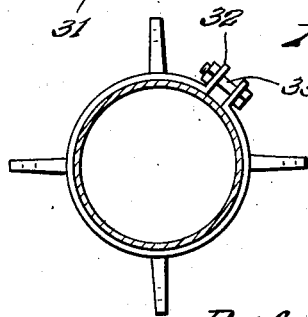
Inventor
Rufus J. Bean.
By Lacey & Lacey
Attorneys Patented Apr. 9, 1940

2,196,622

UNITED STATES PATENT OFFICE 2,196,622

DETACHABLE PIPE COUPLING

Rufus J. Bean, Clipper Mills, Calif.

Application June 27, 1938, Serial No. 216,155

4 Claims. (Cl. 285—164)

This invention relates to couplings and more particularly to a novel form of pipe coupling for detachably uniting the ends of adjacent pipe sections used for conveying water, air and other liquids and gases.

The object of the invention is to provide a pipe coupling of simple and inexpensive construction by means of which adjacent pipe sections forming a part of a continuous fluid conductor may be quickly coupled or uncoupled to change or vary the length of the fluid conductor to meet the working conditions under which it is used.

A further object of the invention is to provide a detachable pipe coupling including mating members, one of which is provided with a flared or bell-shaped mouth and the other with a tapered terminal adapted to fit within the bell-shaped mouth and engage a sealing gasket to form a fluid tight joint between the parts, means being provided for clamping the members together while at the same time permitting a limited lateral movement of one member relative to the other.

A further object is to provide the adjacent ends of the mating pipe sections with lateral anchoring ears connected by two or more turn-buckles for clamping the pipe sections together.

A still further object of the invention is generally to improve this class of devices so as to increase their utility, durability and efficiency.

In the accompanying drawing forming a part of this specification and in which similar numerals of reference indicate corresponding parts in all the figures of the drawing:

Figure 1 is a longitudinal sectional view of a detachable pipe coupling embodying the present invention, Figure 2 is a similar view illustrating a modified form of the invention, Figure 3 is a transverse sectional view taken on the line 3—3 of Figure 2, and Figure 4 is a transverse sectional view illustrating a further modification.

The improved pipe coupling forming the subject-matter of the present invention is especially designed for detachably uniting adjacent sections of a continuous fluid conductor, and by way of illustration is shown in connection with such a conductor, in which 5 designates one of the pipe sections and 6 the adjacent or mating pipe section. Threaded at 7 on the inner end of the pipe section 5 is a coupling head 8 having its inner walls threaded at 9 and its rear end offset at 10 to form a flat annular shoulder 11 for engagement with a washer or gasket 12. Engaging the threads on the coupling head is a correspondingly threaded clamping ring 13 which bears against the gasket 12 and serves to clamp the latter in contact with the shoulder 10. Threaded at 14 on the inner end of the pipe section 6 is a tapered member 15 which fits within the coupling head 8 and bears against the gasket 12, the inner face of the gasket being inclined or beveled at 16 to conform to the taper of the member 15, as best shown in Figure 1 of the drawing. Secured to or formed integral with the coupling head 8 and tapered member 15 are lateral anchoring ears 17 and 18 and connecting said ears are turn-buckles 19. One end of each turn-buckle is pivotally mounted in an opening 20 in the adjacent ear 17 while the other end thereof is provided with an angularly disposed hook 21 adapted to fit within a slot 22 in the mating ears 18 so that, when the turn-buckles are adjusted, the pipe sections will be firmly clamped together with the tapered member 15 in sealing engagement with the gasket 12 and thus form an air and gas tight joint between the parts. It will here be noted that the inner face of the threaded ring 13 is inclined to conform to the inclination of the tapered member 15 so as to provide a clearance between the parts and thus allow one of the pipe sections to be adjusted laterally with reference to the other pipe section when desired. In order to detach the coupling, it is merely necessary to loosen the turn-buckles and disengage the angular hooks 21 from the slots 22 in the ears 18 when said turn-buckles may be swung laterally and the pipe sections detached, as will be readily understood.

In Figure 2 of the drawing, there is illustrated a modified form of the invention in which the coupling head 23 is welded, riveted or otherwise rigidly secured to one pipe section 24 while the tapered member 25 is welded to the mating pipe section 26. In this form of the device, the coupling head 23 is preferably formed with an annular groove 27 which forms a seat for the gasket or washer 28. When using this type of coupling, the pipe sections 24 and 26 are provided with annular bands 29 preferably welded thereto and provided with four or more ears 30 for engagement with the turn-buckles 31 so that the clamping action or pressure exerted on the coupling will be uniform throughout the entire circumference of the pipe sections to be united. If desired, instead of welding the ear-carrying bands 29 to the pipe sections, said bands may be detachably clamped in position on the pipe sections by forming the bands with spaced perforated ears 32 for the reception of the clamping bolts 33, as best shown in Figure 4 of the drawing, this form of the device being found desirable and effective under certain working conditions.

It will, of course, be understood that the couplings may be made in different sizes and shapes and provided with any desired number of turn-buckles or other clamping devices without departing from the spirit of the invention.

Having thus described the invention, what is claimed as new is:

1. A detachable pipe coupling comprising mating pipe sections, one of which is provided with an outwardly flared portion and the other with an inwardly tapered portion, a gasket carried by the flared portion for sealing engagement with the tapered portion, laterally extending ears carried by the pipe sections, certain of which are provided with slots, and turn-buckles connecting said ears, one end of each turn-buckle being provided with an angular hook adapted to enter the slot in an adjacent ear.

2. A detachable pipe coupling comprising mating pipe sections, a coupling head carried by one section and provided with an offset portion defining a vertical shoulder, a gasket seated in the coupling head and normally bearing against the shoulder, a clamping ring threaded within the coupling head for forcing the gasket against said shoulder, a tapered member carried by the other pipe section, ears extending laterally from the coupling head and tapered member respectively, and turn-buckles forming an adjustable connection between said ears.

3. A detachable pipe coupling comprising mating pipe sections, a coupling head secured to the inner end of one pipe section and having its interior walls threaded and its rear portion offset to form a vertical shoulder, a gasket bearing against the shoulder and provided with an inclined face, a threaded clamping ring engaging the threads on the anchoring head for forcing the washer against said shoulder, a tapered member secured to the inner end of the other pipe section and adapted to bear against the inclined face of the gasket, the inner face of the threaded clamping ring being inclined to conform to the inclination of the tapered member and normally spaced therefrom, ears extending laterally from the coupling head and tapered member respectively, and adjustable turn-buckles forming a connection between said ears.

4. A detachable pipe coupling comprising mating pipe sections, a coupling head carried by one section and provided with an offset portion defining a vertical shoulder, a gasket seated in the coupling head and normally bearing against the shoulder, a clamping ring threaded within the coupling head for forcing the gasket against the shoulder and provided with an inwardly tapered portion, a correspondingly tapered member carried by the other pipe section and engaging the gasket in spaced relation to the tapered portion of the clamping ring, and means connecting the coupling head and tapered member for clamping the pipe sections together.

RUFUS J. BEAN.